United States Patent
Rokade et al.

(10) Patent No.: US 8,452,931 B1
(45) Date of Patent: May 28, 2013

(54) SYSTEMS AND METHODS FOR SIMULTANEOUSLY PROVIDING MULTIPLE DATA PROTECTION FUNCTIONS

(75) Inventors: Arun Rokade, Sunnyvale, CA (US); Abhay Singh, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 364 days.

(21) Appl. No.: 12/688,102

(22) Filed: Jan. 15, 2010

(51) Int. Cl.
*G06F 12/16* (2006.01)

(52) U.S. Cl.
USPC .............. 711/162; 711/112; 711/E12.103

(58) Field of Classification Search
USPC ............ 711/162, 163, E12.103, 112
See application file for complete search history.

(56) References Cited

U.S. PATENT DOCUMENTS

| | | | |
|---|---|---|---|
| 8,046,548 B1 * | 10/2011 | Chatterjee et al. | 711/162 |
| 2003/0204597 A1 * | 10/2003 | Arakawa et al. | 709/226 |
| 2004/0148479 A1 * | 7/2004 | Patel et al. | 711/163 |
| 2004/0267836 A1 * | 12/2004 | Armangau et al. | 707/203 |
| 2005/0108485 A1 * | 5/2005 | Perego | 711/162 |
| 2008/0072003 A1 * | 3/2008 | Vu et al. | 711/162 |
| 2008/0320261 A1 * | 12/2008 | Colgrove et al. | 711/162 |
| 2009/0044046 A1 * | 2/2009 | Yamasaki | 714/6 |
| 2009/0249116 A1 * | 10/2009 | Bartfai et al. | 714/6 |
| 2010/0011178 A1 * | 1/2010 | Feathergill | 711/162 |
| 2010/0145909 A1 * | 6/2010 | Ngo | 707/611 |
| 2011/0167435 A1 * | 7/2011 | Fang | 719/329 |

* cited by examiner

*Primary Examiner* — Hal Schnee
(74) *Attorney, Agent, or Firm* — ALG Intellectual Property, LLC

(57) ABSTRACT

A computer-implemented method for simultaneously providing multiple data protection functions may include identifying a storage appliance that provides a plurality of data protection functions to a production system. The computer-implemented method may also include identifying a splitter channel from the production system to the storage appliance. The computer-implemented method may further include creating a synchronization channel from the production system to the storage appliance. The computer-implemented method may additionally include transmitting changes made to data on the production system to the storage appliance via the splitter channel. The computer-implemented method may also include synchronizing data on the production system to the storage appliance via the synchronization channel. Various other methods, systems, and computer-readable media are also disclosed.

20 Claims, 6 Drawing Sheets

SYSTEMS AND METHODS FOR SIMULTANEOUSLY PROVIDING MULTIPLE DATA PROTECTION FUNCTIONS

BACKGROUND

In the digital age, organizations increasingly depend on a variety of data protection functions (e.g., continuous data protection, data replication, etc.) to protect and preserve their data. These organizations may operate under a variety of constraints (financial, technical, institutional, legal, etc.) which may increase their need for flexibility in structuring their data protection solutions. For example, an organization may wish for a single storage appliance to provide multiple data protection functions to a production system.

If storage for the production system is provisioned by a storage area network ("SAN"), the storage appliance may provide data protection functions by directly accessing data from the SAN. However, if storage for the production system is provisioned by direct-attached storage ("DAS"), the storage appliance must access data through the production system. Accordingly, when a data protection function needs to sync with the production storage, the production system may read data from the production storage and send the data to the storage appliance. However, the production system may also be configured to mirror application data writes made to the production storage to the storage appliance. With traditional techniques, if one data protection function attempts to sync with the production storage while the production system mirrors application data writes to another data protection function, the synchronization data may be treated as mirrored application data. In the case of continuous data protection, this may result in losing the snapshot history. In the case of replication, treating synchronization data as mirrored application data may result in unnecessary network traffic.

Furthermore, synchronizing data for data protection functions using traditional technologies may slow down the production system and require throttling synchronization communications to allow active data protection functions to stay active (e.g., to continue to receive mirrored application data). For example, a continuous data protection synchronization that would normally only take a few hours may take weeks if throttled to allow an active replication function to remain active. Accordingly, the instant disclosure identifies a need for simultaneously providing multiple data protection functions efficiently and effectively.

SUMMARY

As will be described in greater detail below, the instant disclosure generally relates to systems and methods for simultaneously providing multiple data protection functions. Embodiments of the instant disclosure may simultaneously provide multiple data protection functions for a production system from a storage appliance by creating separate communication channels between the production system and the storage appliance for synchronization. For example, a method may include identifying a storage appliance that provides a plurality of data protection functions to a production system, identifying a splitter channel from the production system to the storage appliance, and creating a synchronization channel from the production system to the storage appliance. The method may also include transmitting changes made to data on the production system to the storage appliance via the splitter channel and synchronizing data on the production system to the storage appliance via the synchronization channel.

The storage appliance may operate in a variety of contexts. For example, in some contexts at least a portion of the data on the production system may be stored on a direct-attached storage device. In some contexts, the data protection functions that the storage appliance provides may include continuous data protection and/or data replication.

In some embodiments, identifying the splitter channel may entail exposing one or more virtual LUNs from the storage appliance to the production system. Likewise, creating the synchronization channel may entail exposing one or more virtual LUNs from the storage appliance to the production system. In some examples, creating the synchronization channel may mean creating a channel for each data protection function provided by the storage appliance that requires synchronization.

Transmitting changes made to data on the production system to the storage appliance via the splitter channel may include any suitable steps. For example, transmitting the changes via the splitter channel may include intercepting attempts to write to the production system and, for each intercepted write attempt, copying the intercepted write attempt and transmitting the intercepted write attempt to the storage appliance via the splitter channel.

In some examples, synchronizing data on the production system to the storage appliance may include dividing the data into blocks. The method may then, for each block that is not synchronized, lock the unsynchronized block, read data from the unsynchronized block, write the data from the unsynchronized block to the storage appliance via the synchronization channel, and then unlock the unsynchronized block. In various examples, locking the unsynchronized block may include intercepting an attempt to write to an unsynchronized block and then locking the block before allowing the write attempt.

In some examples, a system for simultaneously providing multiple data protection functions may include an identification module, a creation module, a transmission module, and a synchronization module. The identification module may be programmed to identify a storage appliance that provides a plurality of data protection functions to a production system and to identify a splitter channel from the production system to the storage appliance. The creation module may be programmed to create a synchronization channel from the production system to the storage appliance. The transmission module may be programmed to transmit changes made to data on the production system to the storage appliance via the splitter channel. The synchronization module may be programmed to synchronize data on the production system to the storage appliance via the synchronization channel.

In some embodiments, the identification module may identify the splitter channel by exposing one or more virtual LUNs from the storage appliance to the production system. Likewise, the creation module may create the synchronization channel by exposing one or more virtual LUNs from the storage appliance to the production system. In some examples, the creation module may create a channel for each data protection function provided by the storage appliance that requires synchronization.

The transmission module may transmit changes made to data on the production system to the storage appliance via the splitter channel in any suitable manner. For example, the transmission module may be programmed to transmit the changes via the splitter channel by intercepting attempts to write to the production system and, for each intercepted write attempt, copying the intercepted write attempt and transmitting the intercepted write attempt to the storage appliance via the splitter channel.

In some examples, the synchronization module may be programmed to synchronize data on the production system to the storage appliance by dividing the data into blocks. The synchronization module may then, for each block that is not synchronized, lock the unsynchronized block, read data from the unsynchronized block, write the data from the unsynchronized block to the storage appliance via the synchronization channel, and then unlock the unsynchronized block. In various examples, the synchronization module may be programmed to lock the unsynchronized block by intercepting an attempt to write to an unsynchronized block and then locking the block before allowing the write attempt.

In some embodiments, a computer-readable-storage medium may include one or more computer-executable instructions that, when executed by at least one processor of a computing device, cause the computing device to identify a storage appliance that provides a plurality of data protection functions to a production system, identify a splitter channel from the production system to the storage appliance, and create a synchronization channel from the production system to the storage appliance. The computer-executable instructions may also cause the computing device to transmit changes made to data on the production system to the storage appliance via the splitter channel and to synchronize data on the production system to the storage appliance via the synchronization channel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
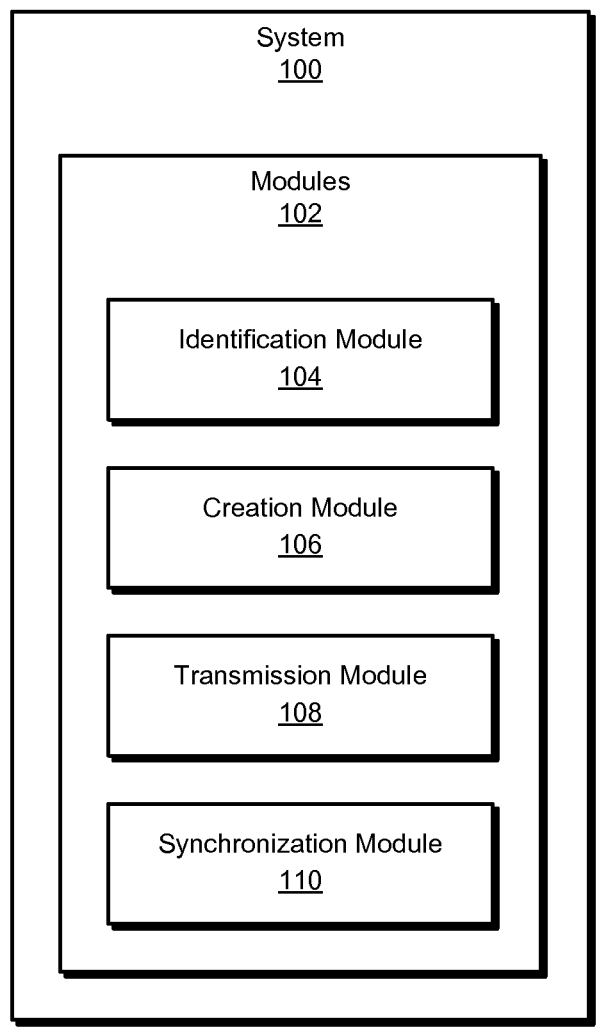
FIG. 1 is a block diagram of an exemplary system for simultaneously providing multiple data protection functions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for simultaneously providing multiple data protection functions. Embodiments of the instant disclosure may simultaneously provide multiple data protection functions from a storage appliance by creating one or more separate channels to the storage appliance for synchronization. By transmitting synchronization data across a separate synchronization channel, embodiments of the instant disclosure may allow for a data protection function to synchronize with the production data without interfering with any other data protection function that receives mirrored application data from the production host. In various contexts, this may prevent data protection failure, wasted network bandwidth, and/or a severe slowdown of synchronization.

Figure 2:
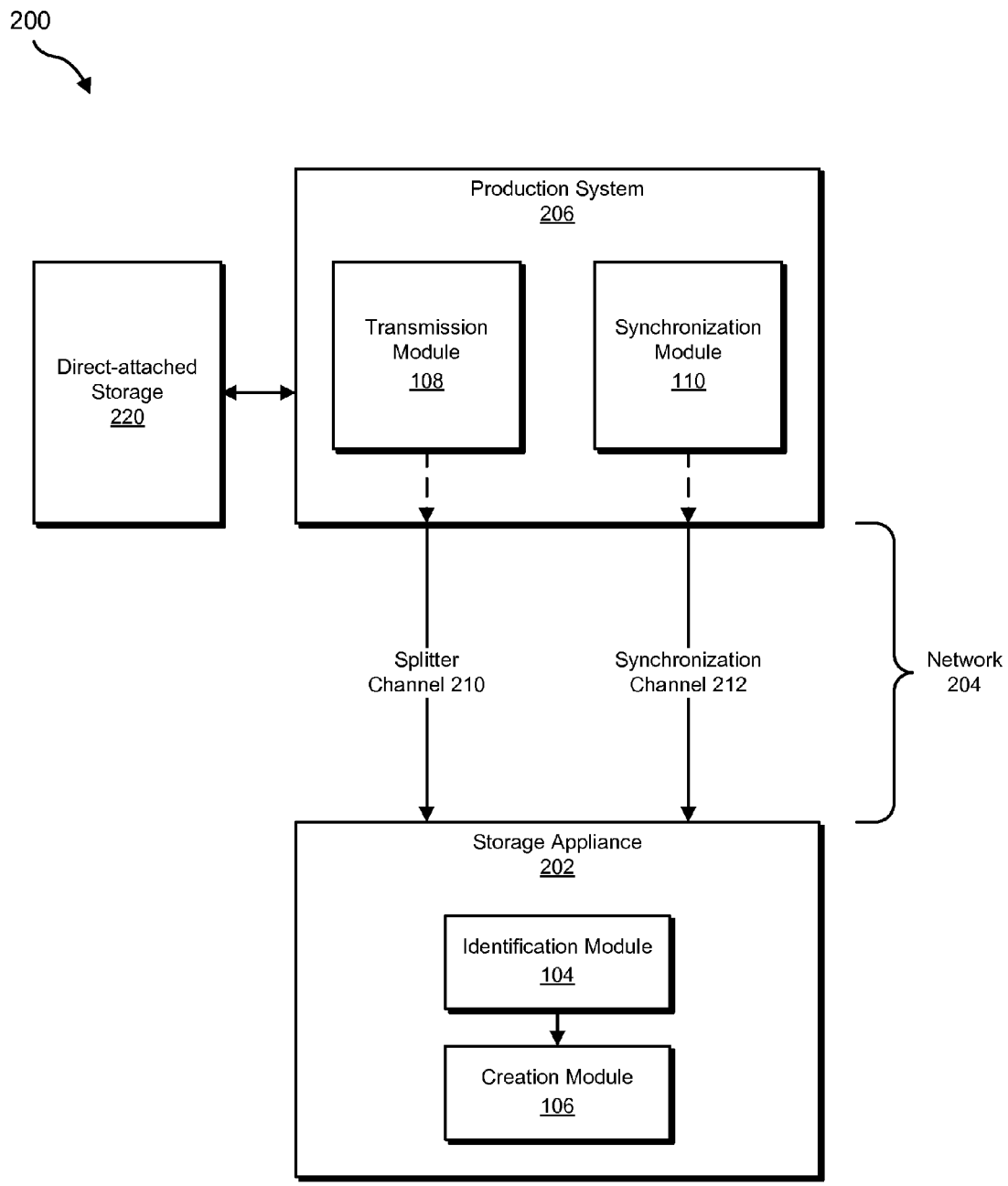
FIG. 2 is a block diagram of an exemplary system for simultaneously providing multiple data protection functions.

The following will provide, with reference to FIGS. 1-2, detailed descriptions of exemplary systems for simultaneously providing multiple data protection functions. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for simultaneously providing multiple data protection functions. As illustrated in this figure, exemplary system 100 may include one or more modules 102 for performing one or more tasks. For example, and as will be explained in greater detail below, exemplary system 100 may include a identification module 104 programmed to identify a storage appliance that provides a plurality of data protection functions to a production system and to identify a splitter channel from the production system to the storage appliance. Exemplary system 100 may also include a creation module 106 programmed to create a synchronization channel from the production system to the storage appliance.

In addition, and as will be described in greater detail below, exemplary system 100 may include a transmission module 108 programmed to transmit changes made to data on the production system to the storage appliance via the splitter channel. Exemplary system 100 may also include a synchronization module 110 programmed to synchronize data on the production system to the storage appliance via the synchronization channel. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., storage appliance 202 and/or production system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a storage appliance 202 in communication with a production system 206 via a network 204. In one embodiment, and as will be described in greater detail below, modules 102 from FIG. 1 may program storage appliance 202 to identify a storage appliance providing a plurality of data protection functions to a production system. For example, storage appliance 202 may identify itself providing a plurality of data protection functions to production system 206. Modules 102 may also program storage appliance 202 to identify a splitter channel from the production system to the storage appliance. For example, storage appliance 202 may identify a splitter channel 210.

Modules 102 may additionally program storage appliance 202 to create a synchronization channel from the production system to the storage appliance. For example, storage appliance 202 may create a synchronization channel 212 from production system 206 to storage appliance 202. Modules 102 may also program production system 206 to transmit changes made to its data to storage appliance 202 via splitter channel 210 and to synchronize its data to storage appliance 202 via synchronization channel 212.

Storage appliance 202 generally represents any type or form of computing device that is capable of providing data protection functions to a computing system. Examples of storage appliance 202 include, without limitation, servers configured to provide various data protection services and/or storage devices with integrated or extended capabilities to provide data protection services.

Production system 206 generally represents any type or form of computing device capable of reading computer-executable instructions. Examples of production system 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between storage appliance 202 and production system 206.

Figure 3:
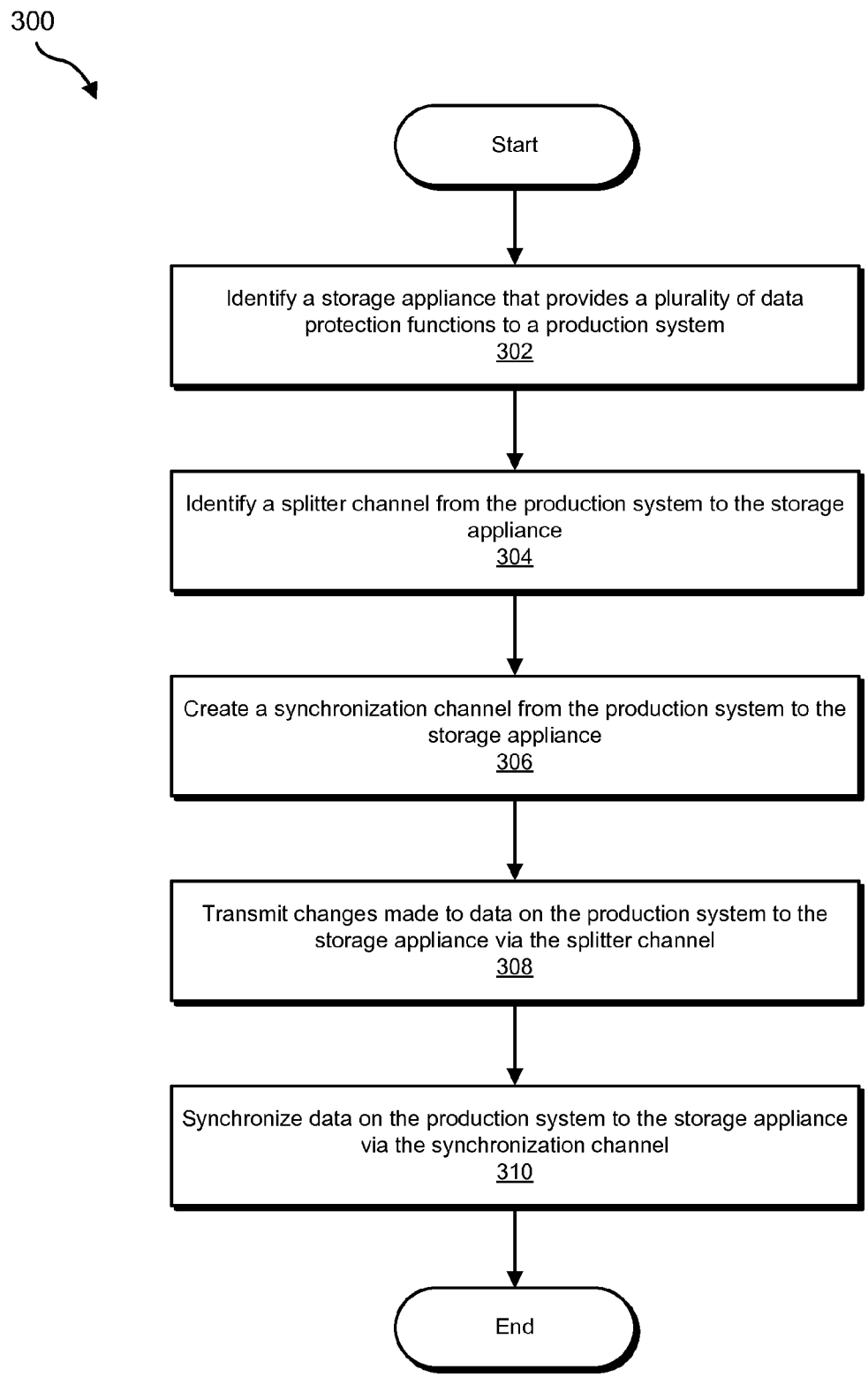
FIG. 3 is a flow diagram of an exemplary method for simultaneously providing multiple data protection functions.
Figure 4:
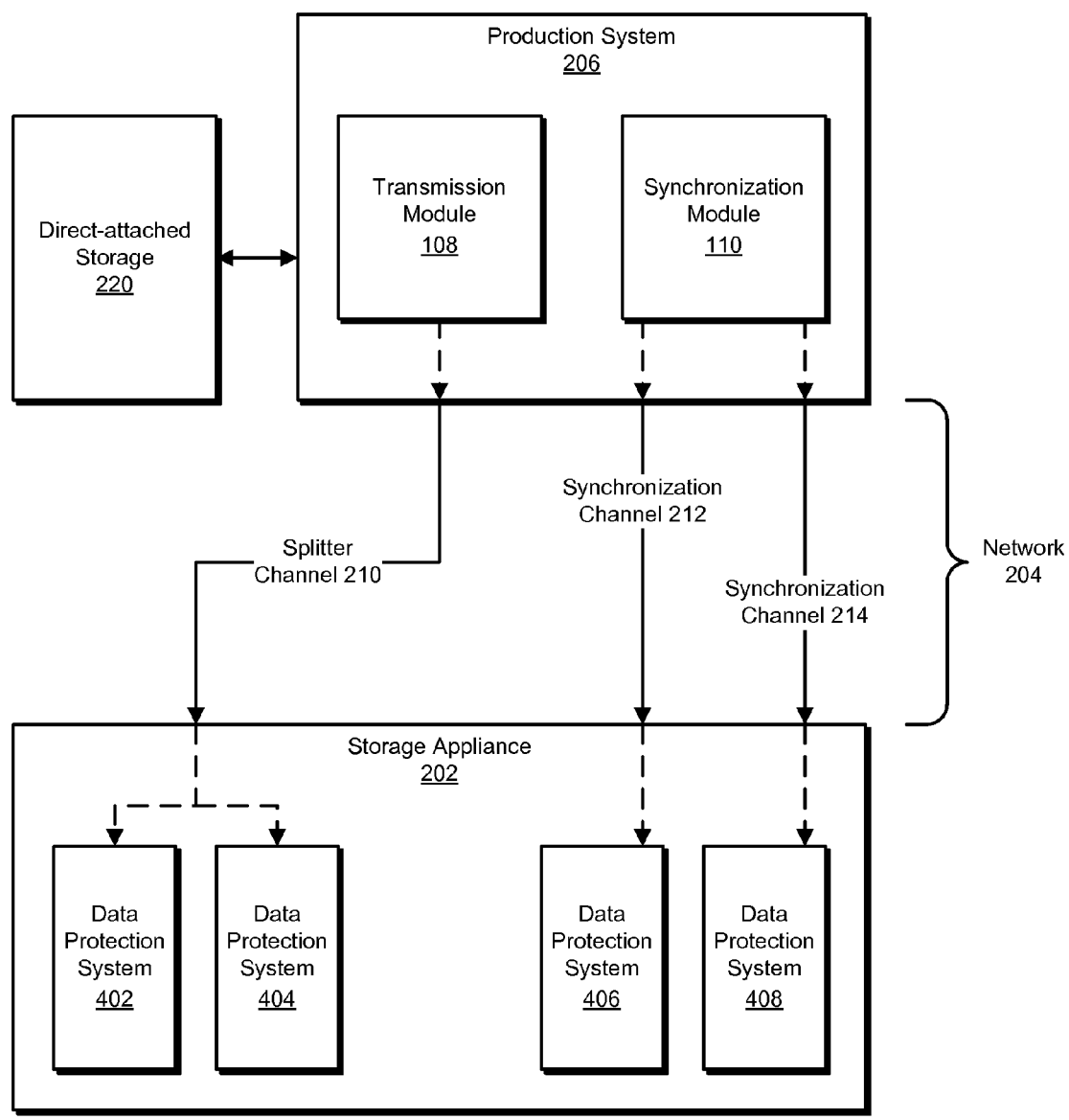
FIG. 4 is a block diagram of an exemplary system for simultaneously providing multiple data protection functions.

FIG. 3 is a flow diagram of an exemplary computer-implemented method 300 for simultaneously providing multiple data protection functions. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a storage appliance that provides a plurality of data protection functions to a production system. For example, at step 302 identification module 104 may, as part of storage appliance 202, identify storage appliance 202 providing multiple data protection functions to production system 206.

As used herein, the phrase "production system" may refer to any computing system capable of receiving data protection services. Additionally, as used herein, the phrase "data protection function" may refer to any function and/or service that maintains at least a partial copy of data from a production system in some format. For example, the plurality of data protection functions may include continuous data protection and/or replication.

The production system may store data in a variety of ways. In various embodiments, the production system may store data in such a way that the storage appliance cannot directly access the data. For example, at least a portion of the data on the production system may be stored on a direct-attached storage device (e.g., a device attached to the production system), such as a direct-attached storage device 220 in FIG. 2. Additionally or alternatively, the data on the production system may be stored on a LUN which is virtualized by a virtualization server, the backend of which could include a file stored in any suitable location (e.g., a shared storage system). For example, data on the production system could be stored in a VMWARE VIRTUAL DISK FILE on a VIRTUAL MACHINE FILE SYSTEM. As will be described in greater detail below, by using separate synchronization channels in contexts in which the storage appliance cannot directly access data on the production system, systems and methods described herein may allow for efficient, effective, and simultaneous application of data protections to the production system.

Identification module 104 may perform step 302 in any suitable manner. For example, identification module 104 may identify the storage appliance that provides a plurality of data protection functions to a production system by reading a configuration file that identifies the storage appliance. In some examples, identification module 104 may receive a message that identifies the storage appliance. In some contexts, identification module 104 may reside on the storage appliance. In these contexts, identification module 104 may identify the storage appliance by running on the storage appliance.

At step 304 one or more of the systems described herein may identify a splitter channel from the production system to the storage appliance. For example, at step 304 identification module 104 may, as part of storage appliance 202, identify splitter channel 210 from production system 206 to storage appliance 202. As used herein, the term "channel" may refer to any distinct means and/or path of transmission. For example, a "channel" may include a network connection and/or a logical-unit number ("LUN"). In this example, a connection to a distinct LUN (whether actual or virtual) may constitute a distinct channel. As used herein, the phrase "splitter channel" may refer to a channel used, at least in part, for transmitting data changes (e.g., changed data and/or changes to data).

Identification module 104 may perform step 304 in any suitable manner. For example, identification module 104 may identify the splitter channel from the production system to the storage appliance by reading a configuration file identifying the splitter channel. Additionally or alternatively, identification module 104 may identify the splitter channel by receiving a message identifying the splitter channel. In some examples, identification module 104 may identify the splitter channel by querying a data protection function.

In some contexts, identification module 104 may take part in creating the splitter channel and consequently identify the splitter channel. In these contexts, identification module 104 may expose one or more virtual LUNs from the storage appliance to the production system. For example, identification module 104 may expose a virtual LUN for each LUN used for production storage. For example, if the production system writes to a LUN X, a LUN Y, and a LUN Z, identification module 104 may expose virtual LUNs X', Y', and Z' to the production system. As will be explained in greater detail below, one or more modules on the production system may then transmit data changes to the storage appliance via the splitter channel (and, in this example, via the corresponding virtual LUN).

Returning to FIG. 3, at step 306 one or more of the systems described herein may create a synchronization channel from the production system to the storage appliance. For example, at step 306 creation module 106 may, as part of storage appliance 202, create a synchronization channel 212 from production system 206 to storage appliance 202. As used herein, the phrase "synchronization channel" may refer to a channel used, at least in part, for transmitting data for synchronization (e.g., an initial synchronization performed by a data protection function and/or a recovery synchronization performed by a data protection function).

Creation module 106 may perform step 306 in any suitable manner. For example, creation module 106 may expose one or more virtual LUNs from the storage appliance to the production system. For example, creation module 106 may expose a virtual LUN for each LUN used for production storage. For example, if the production system writes to a LUN X, a LUN Y, and a LUN Z, creation module 106 may expose virtual LUNs X-sync, Y-sync, and Z-sync to the production system. As will be explained in greater detail below, one or more modules on the production system may then synchronize data to the storage appliance via the synchronization channel (and, in this example, via the corresponding virtual LUN).

In some examples, creation module 106 may create a channel for each data protection function provided by the storage appliance that requires synchronization. Using FIG. 4 as an example, storage appliance 202 in FIG. 4 includes four data protection systems: a data protection system 402, a data protection system 404, a data protection system 406, and a data protection system 408. Data protection systems 402 and 404 may be active (e.g., receiving data changes via splitter channel 210). Data protection systems 406 and 408 may require synchronization. Accordingly, creation module 106 may create synchronization channel 212 and a synchronization channel 214 for synchronizing data to data protection systems 406 and 408, respectively. In some embodiments, data protection systems 406 and 408 may receive data from splitter channel 210 during and/or after synchronization.

Returning to FIG. 3, at step 308 one or more of the systems described herein may transmit changes made to data on the production system to the storage appliance via the splitter channel. For example, at step 308 transmission module 108 may, as part of production system 206, transmit changes made to data on production system 206 (e.g., data stored on direct-attached storage 220) to storage appliance 202 via splitter channel 210.

Transmission module 108 may perform step 308 in any suitable manner. For example, transmission module 108 may transmit changes made to data on the production system to the storage appliance by intercepting attempts to write to the production system and then, for each intercepted write attempt, copying the write attempt and transmitting the intercepted write attempt to the storage appliance via the splitter channel. In some contexts, transmission module 108 may include portions of a file system driver (e.g., a file system filter driver). In these contexts, transmission module 108 may intercept attempts to write to the production system as part of the file system driver.

At step 310 one or more of the systems described herein may synchronize data on the production system to the storage appliance via the synchronization channel. For example, at step 310 synchronization module 110 may, as part of production system 206, synchronize data on production system 206 (e.g., stored on direct-attached storage 220) to storage appliance 202 via synchronization channel 212.

Synchronization module 110 may perform step 310 in a variety of ways. In some examples synchronization module 110 may synchronize data on the production system to the storage appliance via the synchronization channel by first dividing the data into blocks of equal or different sizes. As used herein, the term "block" may refer to any unit of data and/or storage. For example, synchronization module 110 may divide the data on a direct-attached storage device into the regions of the storage device.

After dividing the data into blocks, synchronization module 110 may, for each block that is not synchronized, lock the unsynchronized block (e.g., prevent writing to the block). In some embodiments, locking the unsynchronized block may entail intercepting an attempt to write to the unsynchronized block and then locking the block before allowing the write attempt. After locking the unsynchronized block, synchronization module 110 may read data from the unsynchronized block and write the data to the storage appliance via the synchronization channel. Synchronization module 110 may then unlock the unsynchronized block (and allow any write attempt that may have been intercepted).

By creating and using a separate channel for synchronization, embodiments of the instant disclosure may enable one data protection function to synchronize data while another data protection function is active without interfering with the active data protection function and/or throttling and/or severely degrading the performance of the synchronization. For example, a storage appliance may be configured to protect data corresponding to an application running on two production LUNs, P1 and P2, using data replication. The storage appliance may have exposed virtual LUNs to the production system, V1 and V2, corresponding to LUNS P1 and P2 to capture the split data writes from the application. An administrator may then apply continuous data protection (from the storage appliance) to the production system. In order to perform the initial synchronization of the application data to continuous data protection storage, the storage appliance may expose two virtual LUNs, Vs1 and Vs2, to the production system. Systems described herein may then perform the synchronization via Vs1 and Vs2, leaving the replication protection unaffected by the initial synchronization of the continuous data protection function.

Figure 5:
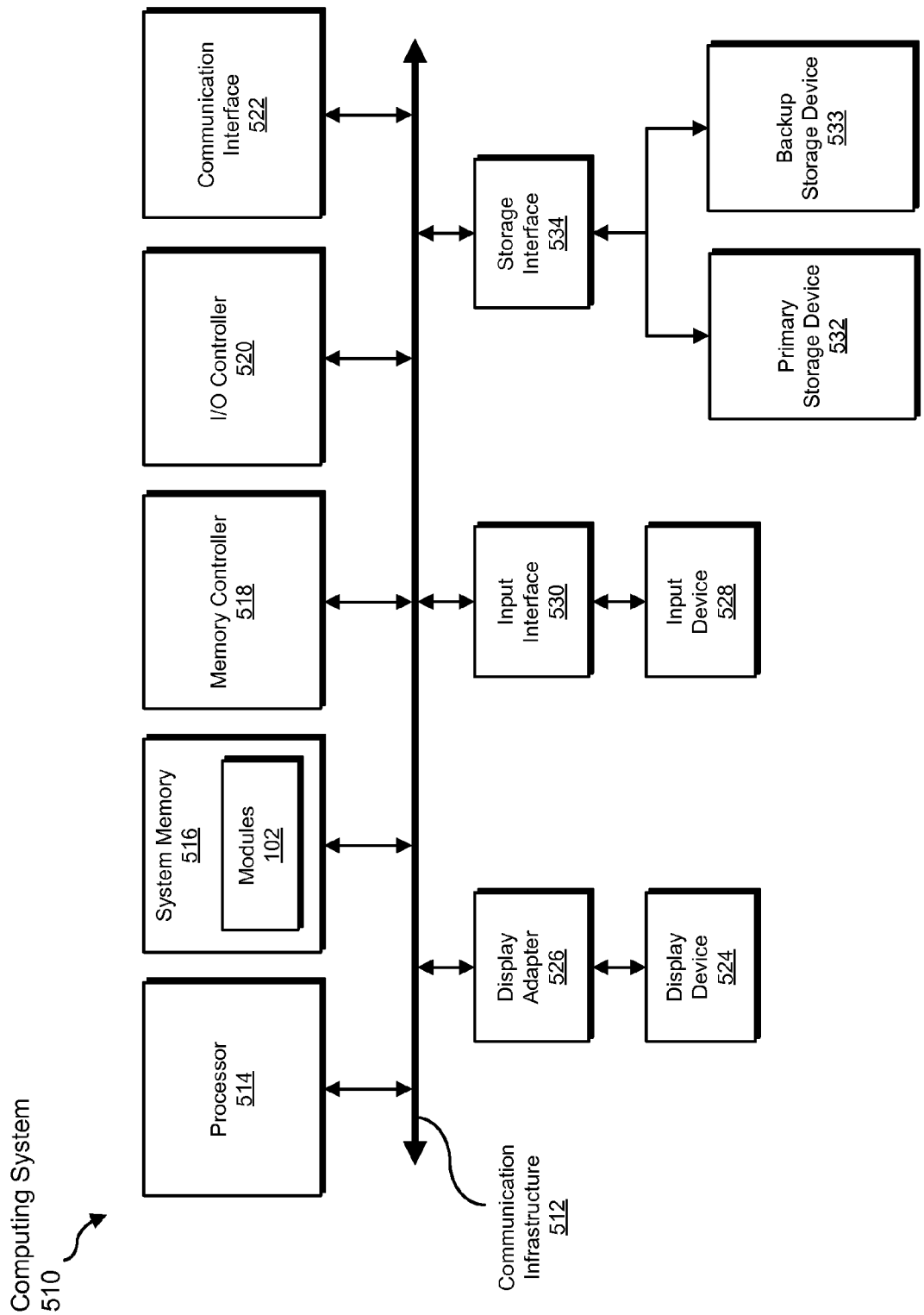
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, exposing, creating, transmitting, intercepting, copying, synchronizing, dividing, locking, reading, writing, and/or unlocking steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, exposing, creating, transmitting, intercepting, copying, synchronizing, dividing, locking, reading, writing, and/or unlocking.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, exposing, creating, transmitting, intercepting, copying, synchronizing, dividing, locking, reading, writing, and/or unlocking steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, exposing, creating, transmitting, intercepting, copying, synchronizing, dividing, locking, reading, writing, and/or unlocking steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, exposing, creating, transmitting, intercepting, copying, synchronizing, dividing, locking, reading, writing, and/or unlocking steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, exposing, creating, transmitting, intercepting, copying, synchronizing, dividing, locking, reading, writing, and/or unlocking steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
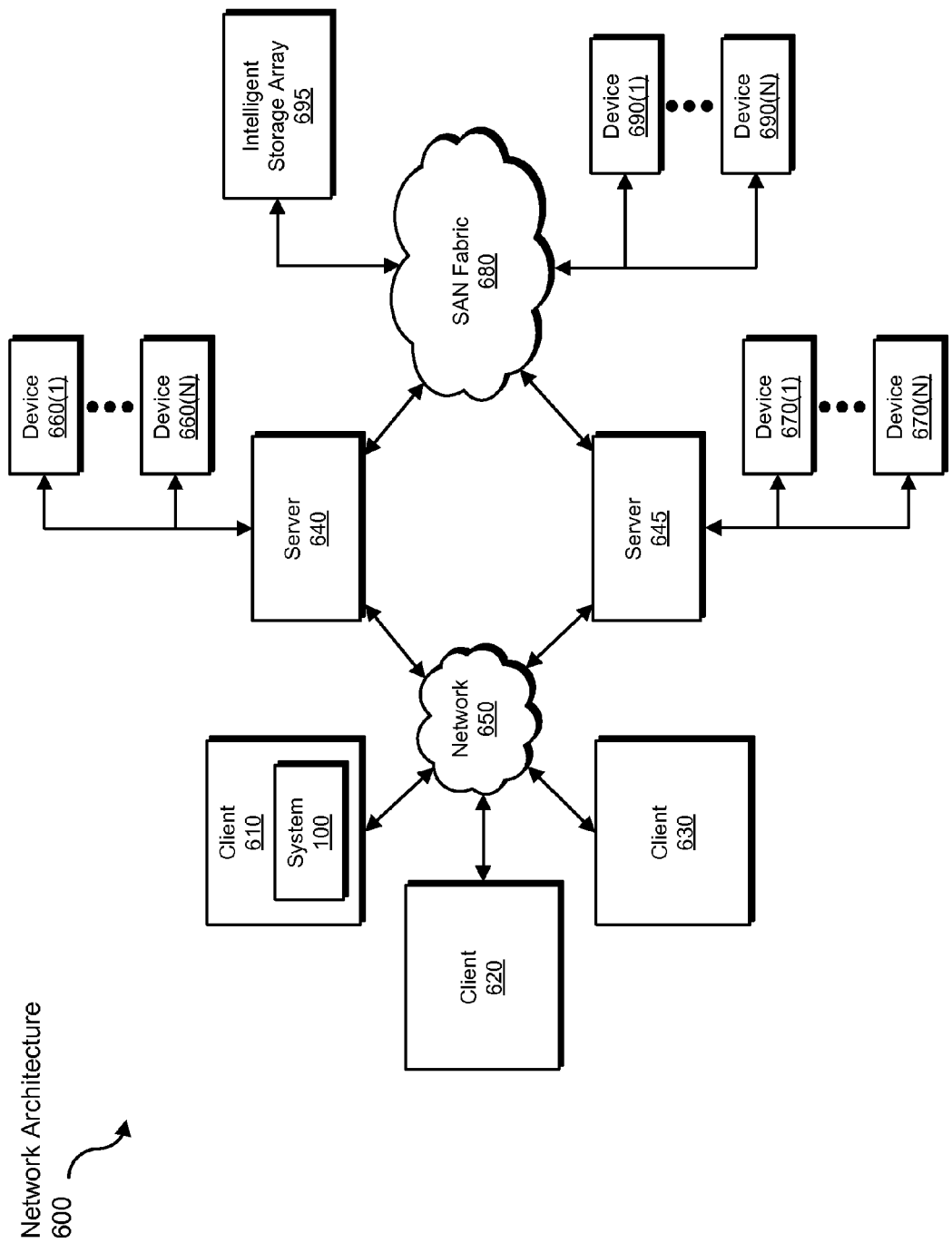
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, exposing, creating, transmitting, intercepting, copying, synchronizing, dividing, locking, reading, writing, and/or unlocking steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for simultaneously providing multiple data protection functions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a storage appliance into a system capable of simultaneously providing multiple data protection functions to a computing system efficiently and effectively.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for simultaneously providing multiple data protection functions, at least a portion of the method being performed by a computing device comprising at least one processor, the method comprising:
    identifying a storage appliance that provides a plurality of data protection functions to a production system, wherein at least a portion of data on the production system is stored on a direct-attached storage device, the direct-attached storage device is directly attached to the production system, and the storage appliance cannot directly access data on the direct-attached storage device;
    identifying a splitter channel for transmitting data changes from the direct-attached storage device of the production system to the storage appliance;
    creating a synchronization channel from the production system to the storage appliance by exposing at least one virtual LUN from the storage appliance to the production system;
    performing a replication data protection function for the production system by transmitting changes made to data on the direct-attached storage device of the production system to the storage appliance via the splitter channel;
    performing a synchronization data protection function for the production system simultaneously with the replication data protection function by synchronizing data on the direct-attached storage device of the production system to the storage appliance via the synchronization channel, wherein:
    performing the synchronization data protection function comprises performing an initial synchronization of application data on the direct-attached storage device;
    the synchronization channel from the production system to the storage appliance is configured via the at least one virtual LUN such that performing the initial synchronization of the application data while the replication data protection function is being performed does not interfere with the replication data protection function and the initial synchronization is not severely degraded by being throttled to allow the replication data protection function to remain active.

2. The computer-implemented method of claim 1, wherein the synchronization channel from the production system to the storage appliance is configured such that the synchronization data protection function can be performed without causing the replication data protection function to fail.

3. The computer-implemented method of claim 1, wherein identifying the splitter channel comprises exposing the at least one virtual LUN from the storage appliance to the production system.

4. The computer-implemented method of claim 1, wherein creating the synchronization channel comprises exposing the at least one virtual LUN from the storage appliance to the production system.

5. The computer-implemented method of claim 1, wherein creating the synchronization channel comprises creating a channel for each data protection function provided by the storage appliance that requires synchronization.

6. The computer-implemented method of claim 1, wherein performing the synchronization data protection function for the production system simultaneously with the replication data protection function by synchronizing the data on the direct-attached storage device of the production system to the storage appliance comprises dividing the data into blocks.

7. The computer-implemented method of claim 6, wherein performing the synchronization data protection function for the production system simultaneously with the replication data protection function by synchronizing the data on the direct-attached storage device of the production system to the storage appliance further comprises, for each block that is not synchronized:
   locking the unsynchronized block;
   reading data from the unsynchronized block;
   writing the data from the unsynchronized block to the storage appliance via the synchronization channel;
   unlocking the unsynchronized block.

8. The computer-implemented method of claim 7, wherein, for each block that is not synchronized, locking the unsynchronized block comprises:
   intercepting an attempt to write to the unsynchronized block;
   locking the unsynchronized block before allowing the write attempt.

9. The computer-implemented method of claim 1, wherein the initial synchronization is performed by a continuous-data-protection system.

10. The computer-implemented method of claim 1, wherein performing the replication data protection function for the production system by transmitting changes made to the data on the direct-attached storage device of the production system to the storage appliance via the splitter channel comprises:
   intercepting attempts to write to the production system;
   for each intercepted write attempt:
     copying the intercepted write attempt;
     transmitting the intercepted write attempt to the storage appliance via the splitter channel.

11. A system for simultaneously providing multiple data protection functions, the system comprising:
   an identification module programmed to:
     identify a storage appliance that provides a plurality of data protection functions to a production system, wherein at least a portion of data on the production system is stored on a direct-attached storage device, the direct-attached storage device is directly attached to the production system, and the storage appliance cannot directly access data on the direct-attached storage device;
     identify a splitter channel for transmitting data changes from the direct-attached storage device of the production system to the storage appliance;
   a creation module programmed to create a synchronization channel from the production system to the storage appliance by exposing at least one virtual LUN from the storage appliance to the production system;
   a transmission module programmed to perform a replication data protection function for the production system by transmitting changes made to data on the direct-attached storage device of the production system to the storage appliance via the splitter channel;
   a synchronization module programmed to perform a synchronization data protection function for the production system simultaneously with the replication data protection function by synchronizing data on the direct-attached storage device of the production system to the storage appliance via the synchronization channel, wherein:
     the synchronization module performs the synchronization data protection function by performing an initial synchronization of application data on the direct-attached storage device;
     the synchronization channel from the production system to the storage appliance is configured via the at least one virtual LUN such that performing the initial synchronization of the application data while the replication data protection function is being performed does not interfere with the replication data protection function and the initial synchronization is not severely degraded by being throttled to allow the replication data protection function to remain active;
   at least one processor configured to execute the identification module, the creation module, the transmission module, and the synchronization module.

12. The system of claim 11, wherein the synchronization channel from the production system to the storage appliance is configured such that the synchronization data protection function does not waste network bandwidth.

13. The system of claim 11, wherein the identification module is programmed to identify the splitter channel by exposing the at least one virtual LUN from the storage appliance to the production system.

14. The system of claim 11, wherein the creation module is programmed to create the synchronization channel by exposing the at least one virtual LUN from the storage appliance to the production system.

15. The system of claim 11, wherein the creation module is programmed to create the synchronization channel by creating a channel for each data protection function provided by the storage appliance that requires synchronization.

16. The system of claim 11, wherein the synchronization module is programmed to perform the synchronization data protection function for the production system simultaneously with the replication data protection function by synchronizing the data on the direct-attached storage device of the production system to the storage appliance by dividing the data into blocks.

17. The system of claim 16, wherein the synchronization module is further programmed to perform the synchronization data protection function for the production system simultaneously with the replication data protection function by synchronizing the data on the direct-attached storage device of the production system to the storage appliance by, for each block that is not synchronized:
   locking the unsynchronized block;
   reading data from the unsynchronized block;
   writing the data from the unsynchronized block to the storage appliance via the synchronization channel;
   unlocking the unsynchronized block.

18. The system of claim 17, wherein, for each block that is not synchronized, the synchronization module is programmed to lock the unsynchronized block by:
intercepting an attempt to write to the unsynchronized block;
locking the unsynchronized block before allowing the write attempt.

19. The system of claim 11, wherein
the synchronization channel from the production system to the storage appliance is configured such that the replication data protection function is unaffected by the synchronization data protection function.

20. A non-transitory computer-readable-storage medium comprising one or more computer-executable instructions that, when executed by at least one processor of a computing device, cause the computing device to:
identify a storage appliance that provides a plurality of data protection functions to a production system, wherein at least a portion of data on the production system is stored on a direct-attached storage device, the direct-attached storage device is directly attached to the production system, and the storage appliance cannot directly access data on the direct-attached storage device;
identify a splitter channel for transmitting data changes from the direct-attached storage device of the production system to the storage appliance;
create a synchronization channel from the production system to the storage appliance by exposing at least one virtual LUN from the storage appliance to the production system;
perform a replication data protection function for the production system by transmitting changes made to data on the direct-attached storage device of the production system to the storage appliance via the splitter channel;
perform a synchronization data protection function for the production system simultaneously with the replication data protection function by synchronizing data on the direct-attached storage device of the production system to the storage appliance via the synchronization channel, wherein:
performing the synchronization data protection function comprises performing an initial synchronization of application data on the direct-attached storage device;
the synchronization channel from the production system to the storage appliance is configured via the at least one virtual LUN such that performing the initial synchronization of the application data while the replication data protection function is being performed does not interfere with the replication data protection function and the initial synchronization is not severely degraded by being throttled to allow the replication data protection function to remain active.

* * * * *